United States Patent
Tsuboi et al.

(10) Patent No.: US 8,379,173 B2
(45) Date of Patent: Feb. 19, 2013

(54) LIQUID CRYSTAL DISPLAY HAVING PARTICULAR FRONT FACE PLATE

(75) Inventors: Hisanori Tsuboi, Kanagawa (JP); Hiroaki Fujii, Kanagawa (JP); Soya Araki, Kanagawa (JP); Ryoichi Teramoto, Kanagawa (JP); Takeshi Sakuma, Kanagawa (JP); Kiyotaka Ninomiya, Kanagawa (JP); Norio Uda, Kanagawa (JP)

(73) Assignee: Sony Corporation (JP)

( * ) Notice: Subject to any disclaimer, the term of this patent is extended or adjusted under 35 U.S.C. 154(b) by 226 days.

(21) Appl. No.: 12/927,823

(22) Filed: Nov. 24, 2010

(65) Prior Publication Data

US 2011/0134378 A1    Jun. 9, 2011

(30) Foreign Application Priority Data

Dec. 3, 2009 (JP) ................ P2009-275486
Aug. 30, 2010 (JP) ................ P2010-192008

(51) Int. Cl.
*G02F 1/1333* (2006.01)
*G02F 1/13* (2006.01)
(52) U.S. Cl. ............... 349/110; 349/84; 349/192
(58) Field of Classification Search .......... 349/110, 349/84, 192, 158
See application file for complete search history.

(56) References Cited

U.S. PATENT DOCUMENTS

| 7,804,624 | B2 * | 9/2010 | Cernasov | 358/474 |
| 2009/0086123 | A1 * | 4/2009 | Tsuji et al. | 349/58 |
| 2009/0186552 | A1 * | 7/2009 | Shinya et al. | 445/58 |
| 2010/0003425 | A1 * | 1/2010 | Kamata et al. | 428/1.5 |

FOREIGN PATENT DOCUMENTS

| JP | 03-204616 A | 9/1991 |
| JP | 06-337411 A | 12/1994 |
| JP | 2005-055641 A | 3/2005 |
| JP | 2008-241728 A | 10/2008 |
| JP | 2008-281997 A | 11/2008 |

OTHER PUBLICATIONS

European Search Report EP 10192577, dated Apr. 4, 2011.

* cited by examiner

*Primary Examiner* — Mike Qi
(74) *Attorney, Agent, or Firm* — Lerner, David, Littenberg, Krumholz & Mentlik, LLP (57) ABSTRACT

A liquid crystal display device with a front face plate having a first section, a second section, and a third section is disclosed. The first section has a light transmissive section and the second section being a light shielding section. The third section may be arranged between the first section and the second section. The third section has a transmittance value which is lower than that of the first section and higher than that of the second section. A method for forming a front face plate assembly of a liquid crystal display device, which may include a front face plate, is also disclosed.

12 Claims, 6 Drawing Sheets

LIQUID CRYSTAL DISPLAY HAVING PARTICULAR FRONT FACE PLATE

CROSS REFERENCE TO RELATED APPLICATIONS

The present application claims priority to Japanese Patent Application No. JP 2009-275486 filed in the Japanese Patent Office on Dec. 3, 2009 and Japanese Patent Application No. JP 2010-192008 filed in the Japanese Patent Office on Aug. 30, 2010, the disclosures of which are incorporated herein by reference in their entirety.

BACKGROUND OF THE INVENTION

1. Field of the Invention

The present invention relates to a liquid crystal display such as a liquid crystal television.

2. Description of the Related Art

In recent years, a liquid crystal display adopting VA (Vertical Alignment) mode is often used as a display monitor for a liquid crystal television, a notebook personal computer, a car navigation system and the like. The liquid crystal display has a liquid crystal display panel in which a liquid crystal layer is sealed between a drive substrate for driving pixels and an opposed substrate provided with a color filter or the like. The liquid crystal display displays an image according to a voltage applied to the liquid crystal display panel.

It has been known that in such a liquid crystal display, in terms of surface protection and design, a front face plate made of a transparent plastic, glass or the like is provided on the front face of the foregoing liquid crystal display panel (display face side) (for example, see Japanese Unexamined Patent Application Publication Nos. 3-204616, 6-337411, 2005-55641, 2008-281997, and 2008-241728). Japanese Unexamined Patent Application Publication No. 3-204616 proposes to insert a transparent material with the adjusted refractive index between the front face plate and a liquid crystal display panel for preventing image lowering due to interface reflection. Further, Japanese Unexamined Patent Application Publication Nos. 6-337411, 2005-55641, and 2008-281997 uses, as such a transparent material, for example, a liquid, a gel sheet, an adhesive sheet, a light curing resin or the like.

For example, of the foregoing transparent materials, in the case where the light curing resin is used, after the light curing resin is sandwiched between the liquid crystal display panel and the front face plate, the resin material may be cured by performing light irradiation from the front face plate side. By using the light curing resin, leakage or the like is hardly generated compared to a case using the liquid material. In addition, dust and air bubbles are hardly mixed in manufacturing compared to a case using the adhesive sheet. Further, the liquid crystal display panel and the front face plate are able to be bonded to each other without being affected by strain of the liquid crystal display panel and the front face plate, a step structure or the like.

Meanwhile, in the front face plate, in some cases, light shielding is provided for a region corresponding to a non-display area (frame section) of the liquid crystal display panel in terms of image improvement and design. Specifically, a light shielding section is formed by evaporation, printing or the like of a light shielding material to a frame-like region along the rim of the front face plate, or bonding an opaque sheet material with the frame-like region along the rim of the front face plate.

SUMMARY OF THE INVENTION

However, in the case where a resin layer made of the light shielding resin is inserted between the front face plate and the liquid crystal display panel, and the foregoing frame-like light shielding section is formed on the front face plate, the following defects are generated. That is, in this case, in the manufacturing process, the resin material is cured by performing light irradiation from the front face plate side on which the light shielding section is formed. Thus, in some cases, frame-like unevenness is generated around the display region after irradiation. It is caused by a fact that an uncured resin material remains in the region corresponding to the light shielding section of the front face plate of the resin layer, and stress balance between the uncured resin material and a cured resin is lost. Thereby, a cell gap around the display region (thickness of the liquid crystal display panel) is changed, and frame-like unevenness is caused. Such unevenness as display unevenness is significantly shown, in particular, when a black screen is observed in a diagonal direction, resulting in lowering of display quality.

A technique to cure a resin on the rear side of the light shielding section of the front face plate by other curing means by giving thermal curing characteristics or moisture curing characteristics to such a light curing resin has been proposed (see Japanese Unexamined Patent Application Publication No. 2008-241728). However, in such a technique, a curing step is added and the number of equipments is increased. In addition, due to mechanical characteristic difference between the light-cured resin part and the resin part cured by other means (thermal curing or moisture curing), unevenness is generated as a result. Thus, such a technique has not solved the foregoing disadvantages.

In view of the foregoing, in the invention, it is desirable to provide a liquid crystal display in which a plate-like member having a light shielding section is provided on the panel display side with a light curing resin in between, and display unevenness around the display region is able to be inhibited.

In accordance with an aspect of the invention, a liquid crystal display device ("LCD") is provided. Such LCD may comprise a front face plate having a first section, a second section, and a third section, the first section being a light transmissive section and the second section being a light shielding section. The third section may be arranged between the first section and the second section, and the third section may have a transmittance value which is lower than that of the first section and higher than that of the second section.

The third section may include a number of opaque regions, each opaque region having a predetermined shape. The ratio of an area occupied by the number of opaque regions to a total area of the third section may gradually increase from a side of the third section which adjoins the first section to an opposite side of the third section which adjoins the second section.

The predetermined shape of the opaque regions may be circular, square, or triangular. If the predetermined shape of the opaque regions is circular or square, the opaque regions may gradually increase in size from a side of the third section which adjoins the first section to an opposite side of the third section which adjoins the second section. When the opaque regions are circular, a diameter of each circular shape may increase from approximately 0.7 mm to approximately 1.2 mm and when the opaque regions are square a side of each square shape may increase from approximately 0.5 mm to approximately 1.0 mm. When the predetermined shape of the opaque regions is triangular, each triangular shape may have a bottom width of approximately 1.5 mm and a height of approximately 4 mm.

The front face plate may include a display region and an outer region outside of the display region, in which at least a substantial portion of the first section is in the display region and an entire portion of the second section and an entire portion of the third section are in the outer region. A liquid crystal display panel may be arranged to be substantially parallel to the front face plate such that the liquid crystal display panel has a plurality of pixels arranged therein, which are aligned with the display region. The second section and the third section may be located on a side of the front face plate which faces the liquid crystal display panel.

A light curing resin layer may be positioned between the front face plate and the liquid crystal display panel such that an entire surface of the first section contacts the resin layer, at least a portion of a surface of the third section contacts the resin layer, and the second section is located entirely away from the resin layer so as to avoid contact thereof.

The first section may have a rectangular shape, the third section may be formed outside a perimeter of the rectangular shaped first section, and the second section may be formed outside a perimeter of the third section.

In accordance with another aspect of the invention, a method for forming a front face plate assembly of an LCD in which the front face plate assembly has a display side and a non-display side opposite the display side is provided. Such method may comprise fabricating a second section that is a light shielding section on the non-display side of the front face plate assembly. A third section may be fabricated on the non-display side such that the second section borders the third section and the third section borders a first section, the first section being a transmissive section. The third section may have a transmittance value lower than that of the first section and higher than that of the second section. A resin layer may be fabricated on the non-display side of the front face plate assembly. A liquid crystal display panel may be fabricated on the resin layer, and the resin layer may be cured.

The resin layer may be cured by irradiating light from a position affronting the display side of the front face plate assembly. The light may travel through the first section and the third section so as to impact the resin layer, in which the light is partially absorbed by the third section. In one embodiment, the light irradiated may be between approximately 1500 mJ/cm$^2$ to approximately 15000 mJ/cm$^2$.

DETAILED DESCRIPTION OF THE PREFERRED EMBODIMENT

Figure 1:
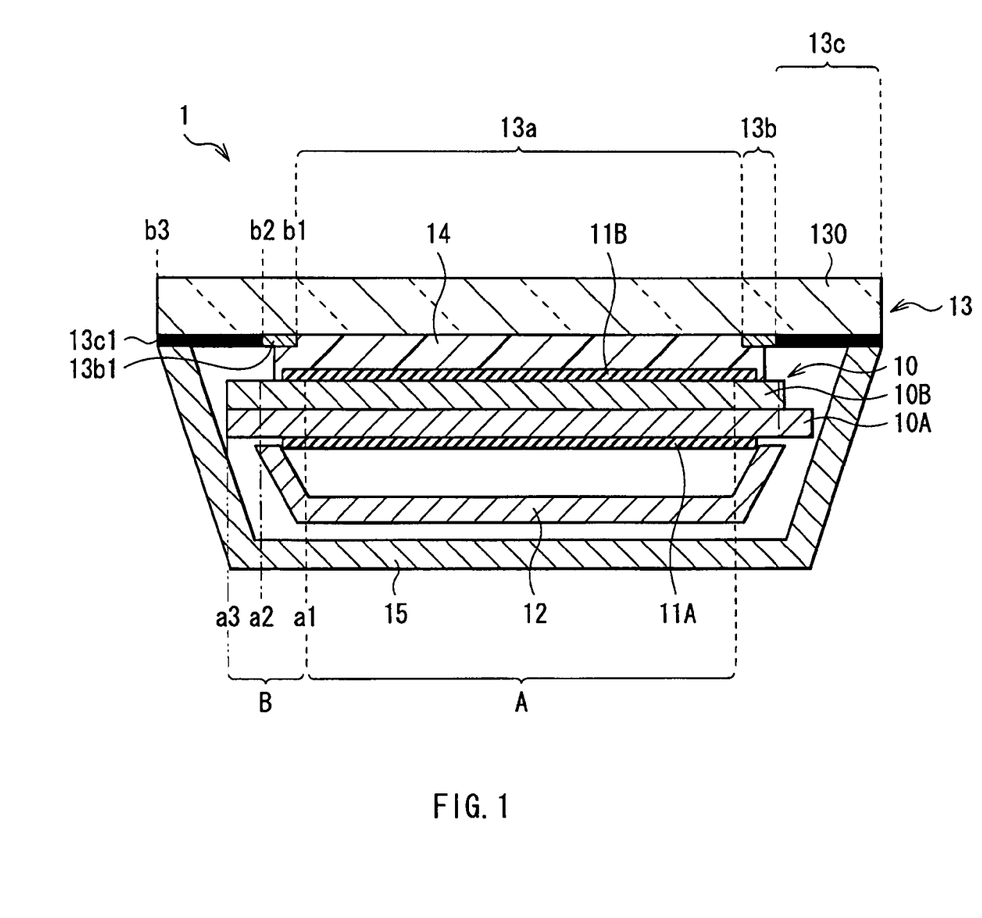
FIG. 1 is a cross sectional view illustrating a configuration of a liquid crystal display according to a first embodiment of the invention.
Figure 2:
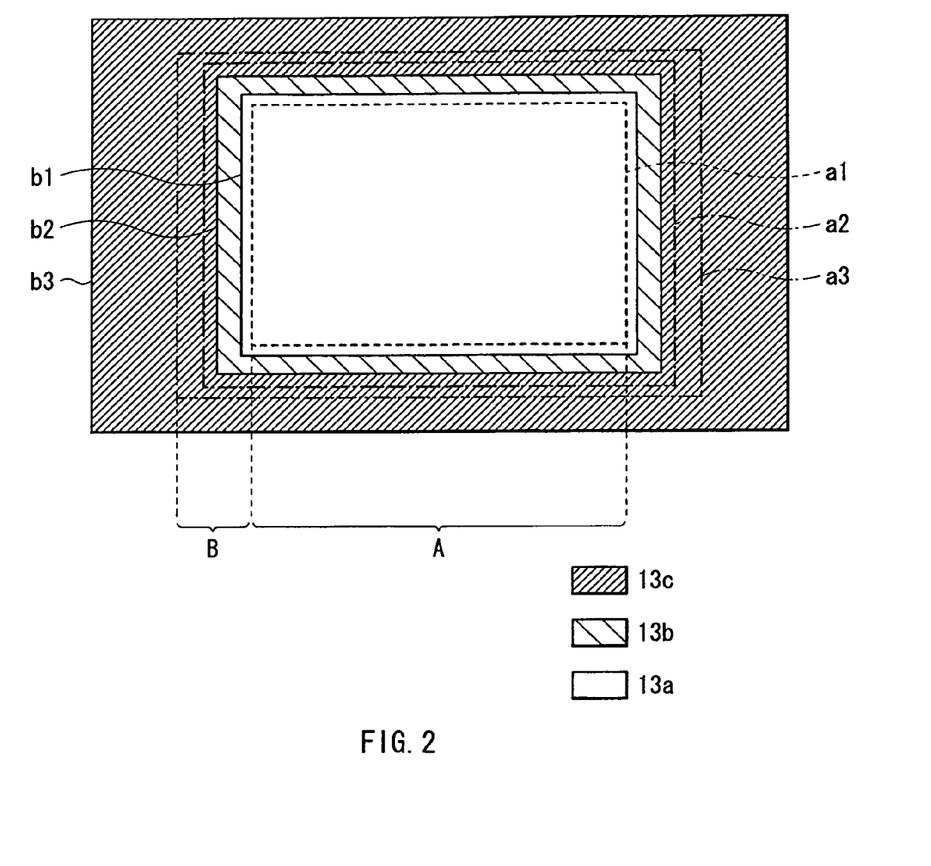
FIG. 2 is a plan view illustrating a structure of the front face plate illustrated in FIG. 1.

An embodiment of the invention will be hereinafter described in detail with reference to the drawings. The description will be given in the following order:
1. Embodiment (example that a half-transmissive section is provided in a front face plate)
2. Examples Embodiment Configuration of a Liquid Crystal Display 1
FIG. 1 is a cross sectional view illustrating a schematic structure of a liquid crystal display 1 according to an embodiment of the invention. FIG. 2 is a plan view illustrating a structure of a front face plate. The liquid crystal display 1 is, for example, an active matrix type display unit in which video display is performed for every pixel based on a video signal transmitted from a data driver (not illustrated) by a drive signal supplied from a gate driver (not illustrated).

The liquid crystal display 1 includes a backlight unit 12 on the rear face side (light incident side) of a liquid crystal display panel 10 and a front face plate 13 (plate-like member) on the display side (light emitting side), respectively. The liquid crystal display panel 10 and the backlight unit 12 are arranged in a package member 15. Between the liquid crystal display panel 10 and the front face plate 13, a light curing resin layer 14 is provided.

The liquid crystal display panel 10 is intended to perform video display based on illumination light from the backlight unit 12. In the liquid crystal display panel 10, a liquid crystal layer (not illustrated) is sealed between a drive substrate 10A and an opposed substrate 10B. Polarizing plates 11A and 11B are bonded to outside faces of the drive substrate 10A and the opposed substrate 10B. In the drive substrate 10A, a TFT (Thin Film Transistor) for driving each pixel is arranged on, for example, a glass substrate, and a drive circuit for supplying a video signal or the like to each pixel, a wiring substrate for connecting with outside and the like are provided. In the opposed substrate 10B, each color filter (not illustrated) composed of three primary colors (R, G, and B) is formed for every pixel on, for example, a glass substrate. As the liquid crystal layer, for example, a layer containing a nematic liquid crystal such as VA (vertical alignment) mode, TN (Twisted Nematic) mode, and IPS (In Plane Switching) mode is used. The drive substrate 10A and the opposed substrate 10B are not necessarily provided in this order. Further, the color filter is not necessarily provided. Otherwise, the color filter may be provided in the drive substrate 10A instead of in the opposed substrate 10B. Further, as the drive device, a device other than the TFT may be used.

In the liquid crystal display panel 10, a region around a display region A (rectangle region surrounded by border line a1) is a non-display region B (frame-like region outside of the border line a1). In the display region A, a plurality of pixels are arranged in a state of matrix. In the non-display region B, the foregoing drive circuit for driving each pixel, the foregoing wiring substrate for connecting with outside and the like are arranged. Further, the non-display region B includes a light shielding region (frame-like region that is outside of the border line a1 and inside of border line a2), and a non-light shielding region (frame-like region that is outside of the border line a2 and inside of panel edge a3).

The backlight unit 12 is intended to illuminate the liquid crystal display panel 10 from the rear face thereof directly or through an optical member such as a light guide plate with the use of, for example, a fluorescent bulb such as a CCFL (Cold Cathode Fluorescent Lamp), an LED (Light Emitting Diode) or the like as a light source.

Structure of the Front Face Plate 13

The front face plate 13 is provided for the purpose of surface protection and design improvement of the liquid crystal display panel 10. The base material of the front face plate 13 is a transparent substrate 130 made of, for example, glass, plastic or the like. Examples of plastic include acryl and polycarbonate. The outside dimensions of the front face plate 13 are larger than the outside dimensions of the liquid crystal display panel 10. An edge of the front face plate 13 (front face plate edge b3) is extended outside than the edge of the liquid crystal display panel 10 (panel edge a3) by, for example, about from 5 mm to 100 mm both inclusive. However, in particular, for the purpose of a large display, in terms of dimension stability, a glass material is desirably used. Further, on the surface on the observation side or display side of the front face plate 13, non-reflecting process or low reflecting process is preferably provided. The thickness of the transparent substrate 130 is, for example, from 0.2 mm to 5.0 mm both inclusive.

In the front face plate 13, the rectangle region corresponding to the display region A of the liquid crystal display panel 10 is a transmissive section, which may be considered a first section, 13a for transmitting display light. The region around the transmissive section 13a, that is, the frame-like region approximately corresponding to the non-display region B of the liquid crystal display panel 10 is a light shielding section, which may be considered a second section, 13c. The light shielding section 13c is formed on the front face plate 13 for the purpose of improving image quality and design.

In this embodiment, in the front face plate 13, a half-transmissive section, which may be considered a third section, 13b with the light transmittance that is lower than that of the transmissive section 13a and higher than that of the light shielding section 13c is formed in the region between the transmissive section 13a and the light shielding section 13c. In other words, the frame-like half-transmissive section 13b is provided to surround the rectangle transmissive section 13a, and the frame-like light shielding section 13c is provided to surround the half-transmissive section 13b. The transmissive section 13a is composed of the transparent substrate 130 itself of the front face plate 13. The light shielding section 13c is obtained by forming a light shielding layer 13c1 on one face of the transparent substrate 130, which may be on a non-display side (in this case, face on the light curing resin layer 14 side). The half-transmissive section 13b is obtained by forming a half-transmissive layer 13b1 on one face of the transparent substrate 130, which may also be on the non-display side (in this case, face on the light curing resin layer 14 side). The display side of the front face plate 13 may be opposite the non-display side.

Figure 3A:
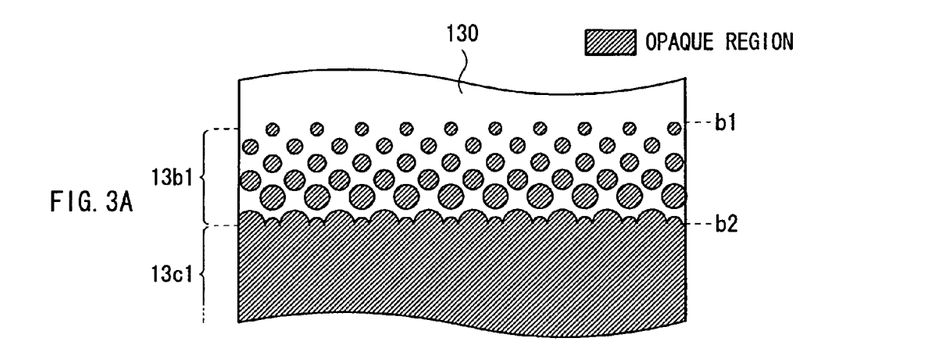
FIGS. 3A to 3C are an example of a planar structure of the front face plate illustrated in FIG. 1.
Figure 3B:
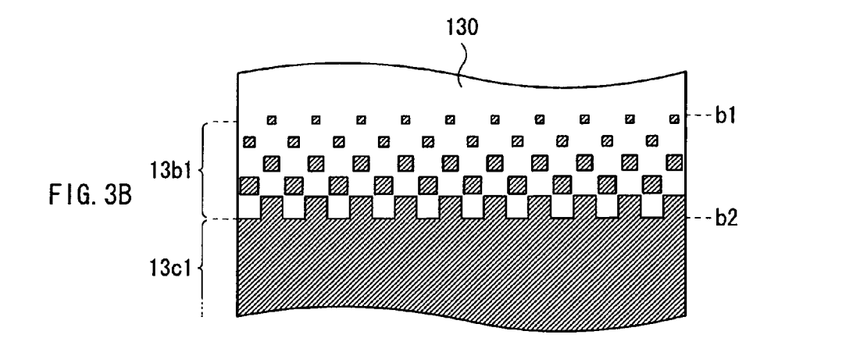
Figure 3C:
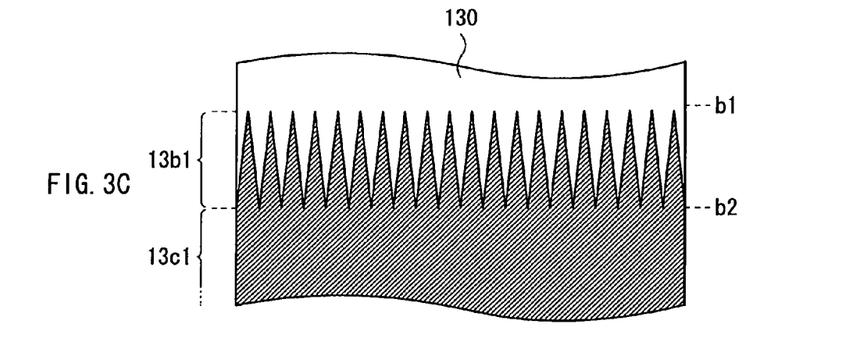

FIGS. 3A to 3C illustrate planar structures in the vicinity of edges b1 and b2 of the half-transmissive layer 13b1 on the transparent substrate 130. As illustrated in FIGS. 3A to 3C, in the light shielding layer 13c1, the whole area in the light shielding layer 13c1 on the transparent substrate 130 is an opaque region. In the half-transmissive layer 13b1, a selective region in the half-transmissive layer 13b1 on the transparent substrate 130 is an opaque region and the other region is a transparent region. The opaque region in the half-transmissive layer 13b1 and the light shielding layer 13c1 is obtained by forming an opaque material such as carbon black, a metal, and a pigment having a film thickness from 0.1 µm to 100 µm. Meanwhile, the transparent region in the half-transmissive layer 13b1 is a region composed of the transparent substrate 130 itself. In the half-transmissive section 13b having the half-transmissive layer 13b1 exhibits half transmissive characteristics since such an opaque region and such a transparent region coexist in the plane, and the light transmittance thereof corresponds to the ratio occupied by the opaque region in the whole half-transmissive section 13b (opaque region/(transparent region+opaque region). The light transmittance of the half-transmissive section 13b may be uniform (constant) in the half-transmissive section 13b, or may be changed in the half-transmissive section 13b as will be described below.

Specifically, in the half-transmissive layer 13b1, for example, a plurality of circular opaque regions are formed in a repeated pattern, and the size of each circle is gradually increased from the edge b1 toward the edge b2, that is, from the transmissive section 13a side to the light shielding section 13c side (FIG. 3A). In other words, the ratio occupied by the opaque region in the whole half-transmissive section 13b is gradually increased from the transmissive section 13a side to the light shielding section 13c side. Thereby, the light transmittance is gradually decreased from the transmissive section 13a side to the light shielding section 13c side.

Figure 4:
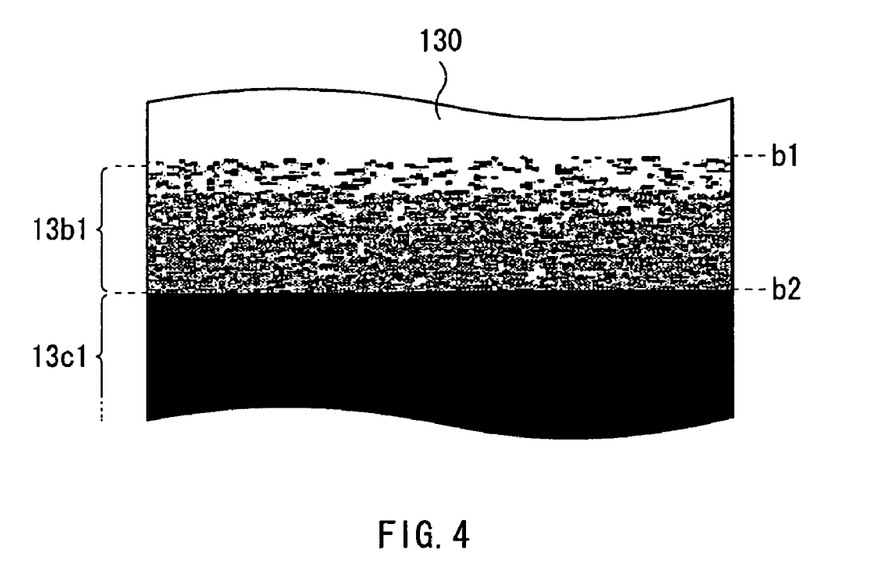
FIG. 4 is another example of a planar structure of the front face plate illustrated in FIG. 1.

However, the planar shape of the opaque region in the half-transmissive layer 13b1 is not limited to the foregoing circular shape, but may be the square shape as illustrated in FIG. 3B in which, for example, the opaque region and the transmissive region are included in a staggered pattern. Further, the planar shape is not limited to the square shape, but may be other polygonal shape such as a triangle shape and a rectangle shape. Otherwise, as illustrated in FIG. 3C, the opaque region in the half-transmissive layer 13b1 may be saw-like shape in which isosceles triangles are formed in repeating fashion. With such a structure, the light transmittance is able to be gradually decreased from the transmissive section 13a side to the light shielding section 13c side as well. Further, the planar shape of the opaque region in the half-transmissive layer 13b1 is not necessarily in a repeating pattern. As illustrated in FIG. 4, the half-transmissive layer 13b1 may have a planar structure in which a plurality of minute opaque regions are dispersed and arranged so that the light transmittance is gradually decreased from the transmissive section 13a side to the light shielding section 13c side. In FIG. 4, the section colored black is the opaque region.

Further, the opaque region may be formed in a regular arrangement, but may be formed in an irregular (random) arrangement. Further, each planar shape of the respective opaque regions is not necessarily identical with each other, but may be different from each other. However, in any case, it is desirable that the ratio of the foregoing opaque region is smaller on the transmissive section 13a side and is larger on the light shielding section 13c side. In other words, it is desirable that the light transmittance in the half-transmissive section 13b is higher on the transmissive section 13a side and is lower on the light shielding section 13c side. Further, it is more desirable that in the half-transmissive section 13b, the ratio of the foregoing opaque region is gradually increased, the light transmittance is gradually decreased from the transmissive section 13a side to the light shielding section 13c side as in this embodiment. Thereby, stress balance between the uncured resin and the cured resin is easily retained favorably.

As illustrated in FIG. 1 and FIG. 2, the foregoing edge b1 on the transmissive section 13a side of the half-transmissive section 13b is arranged outside of the border line a1 (on the non-display region B side). Meanwhile, the edge b2 on the light shielding section 13c side of the half-transmissive section 13b is arranged inside of the border line a2 (on the light shielding region side). That is, in this embodiment, the half-transmissive section 13b is provided in the light shielding region in the non-display region B. Due to such arrangement, light from the backlight unit 12 is able to be prevented from being leaked through the half-transmissive section 13b. However, the position of the edge b2 of the half-transmissive section 13b is not particularly limited, and may be arranged outside of the border line a2 (non-light shielding region side). For example, in the non-light shielding region in the non-display region B (outside of the border line a2), light shielding is enabled by using other light shielding member. In such a case, the edge b2 of the half-transmissive section 13b may be in the non-light shielding region. Further, the edge b1 may be overlapped with the border line a1. Further, the planar dimensions of the half-transmissive section 13b may be the same as the planar dimensions of the light shielding region in the non-display region B (the edge b1 may be overlapped with the border line a1, and the edge b2 may be overlapped with the border line a2 at the same time).

Structure of the Light Curing Resin Layer 14

The light curing resin layer 14 has a function to inhibit interface reflection between the liquid crystal display panel 10 and the front face plate 13. For example, the light curing resin layer 14 is made of a silicone resin, an epoxy resin, an acryl resin or the like that is cured by ultraviolet light or visible light, and is desirably made of the acryl resin. As the acryl resin, an oligomer, an acryl monomer, a resin composition of matter containing a photopolymerization initiator, a plasticizer and the like are desirable. Examples of oligomer include polyurethane acrylate, polybutadiene acrylate, polyester acrylate, and epoxy acrylate. As an acryl monomer, for example, a monofunctional acryl monomer is desirably used.

In the light curing resin layer 14, the refractive index is desirably almost equal to the refractive index of the front face plate 13 (for example, from 1.4 to 1.6 both inclusive). Thereby, interface reflection is able to be more effectively inhibited. Further, in terms of manufacturing process, the viscosity of the resin before curing in the light curing resin layer 14 is desirably from 100 to 4000 mPa·s both inclusive. Further, to inhibit display unevenness, the curing shrinkage ratio in curing the resin in the light curing resin layer 14 is desirably 4% or less. The storage elastic modulus at 25 deg C. after curing the resin is desirably $1.0*10^6$ Pa or less.

The thickness of the light curing resin layer 14 is desirably from 20 μm to 5 mm both inclusive, and more desirably from 20 μm to 500 μm both inclusive. If the thickness of the light curing resin layer 14 is smaller than 20 μm, adhesive strength is decreased, or manufacturing characteristics are deteriorated. Meanwhile, if the thickness is larger than 500 μm, image depth feel stands out, design quality is lowered, cost is increased since the usage amount of the resin material is increased, and the weight of the whole unit is increased.

Method of Manufacturing the Liquid Crystal Display 1

Figure 5A:
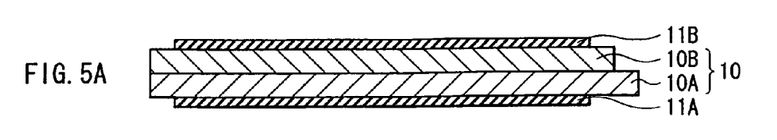
FIGS. 5A and 5B are cross sectional views illustrating part of a method of manufacturing the liquid crystal display illustrated in FIG. 1.
Figure 5B:
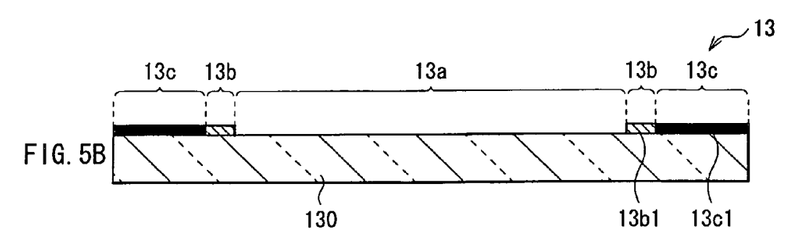
Figure 6:
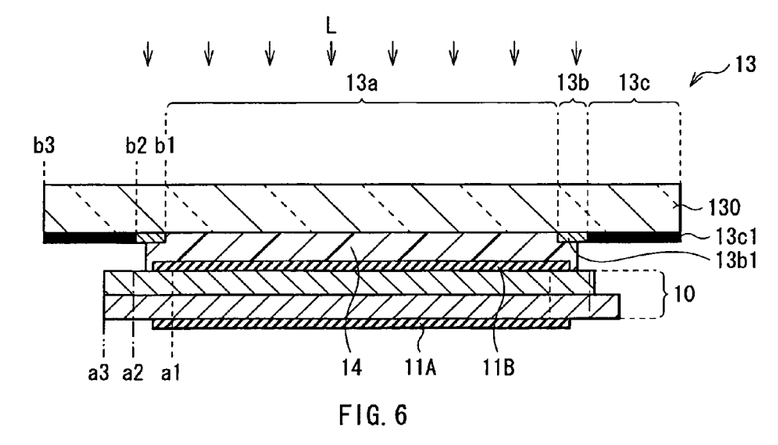
FIG. 6 is a cross sectional view illustrating a step following FIGS. 5A and 5B.

FIG. 5A to FIG. 6 illustrate part of a method of manufacturing the liquid crystal display 1 in order of steps. The liquid crystal display 1 as described above is able to be manufactured, for example, as follows.

First, as illustrated in FIG. 5A, the liquid crystal display panel 10 is formed. That is, the drive substrate 10A in which the TFT, the drive circuit and the like are arranged and the opposed substrate 10B having the color filter are bonded to the liquid crystal layer (not illustrated) in between. After that, the polarizing plates 11A and 11B are bonded to the outside faces of the drive substrate 10A and the opposed substrate 10B.

Meanwhile, as illustrated in FIG. 5B, the opaque material as described above is, for example, evaporated or printed on a given frame-like region on the transparent substrate 130. Thereby, the front face plate 13 having the half-transmissive layer 13b1 and the light shielding layer 13c1 is formed. At this time, in the light shielding layer 13c1, the opaque material is evaporated or printed on the transparent substrate 130 in solid fashion, and thereby the whole area in the light shielding layer 13c1 becomes the opaque region.

Meanwhile, in the half-transmissive layer 13b1, the opaque material is evaporated or printed on a selective region on the transparent substrate 130, and thereby the selective region in the half-transmissive layer 13b1 becomes the opaque region, and the other region becomes the transparent region. In the case where the half-transmissive layer 13b1 is formed by evaporation, as an evaporation mask, a mask having an aperture corresponding to the repeating pattern of the opaque region as described above may be used. Otherwise, in the case where the half-transmissive layer 13b1 is formed by printing, a printing plate corresponding to the repeating pattern of the opaque region as described above may be used by, for example, screen printing or offset printing. The half-transmissive layer 13b1 and the light shielding layer 13c1 may be directly formed on the transparent substrate 130 as described above. Otherwise, it is possible that the light shielding layer 13c1 and the half-transmissive layer 13b1 are previously formed on other transparent sheet, and the sheet is bonded to the transparent substrate 130.

On the surface of the observation side of the front face plate 13, non-reflecting process or low reflecting process is preferably provided. Such a process is able to be performed by, for example, evaporating a non-reflecting material or a low reflecting material or coating with the same, or bonding a non-reflecting film, a low reflecting film or the like.

Subsequently, as illustrated in FIG. 6, the liquid crystal display panel 10 and the front face plate 13 formed as above are layered with the light curing resin layer 14 in between. From the front face plate 13 side, light L in a wavelength region by which the resin material in the light curing resin layer 14 is cured, such as ultraviolet light and visible light is irradiated. Specifically, light with photosensitive wavelength in a photo initiator contained in the light curing resin layer 14 may be used. However, in terms of productivity, a lamp having the light emitting center of 365 nm or 405 nm, an LED having such a light emitting wavelength or the like is preferably used. Further, the illuminance and the light amount of the light L may be set according to the composition, the thickness and the like of the resin material used for the light curing resin layer 14. However, it is desirable that the accumulated light amount is set to from 1500 to 15000 mJ/cm$^2$ both inclusive, and the luminance is set to from 10 to 500 mW/cm$^2$ both inclusive, respectively. Accordingly, the front face plate 13 is bonded to the liquid crystal display panel 10 with the light curing resin layer 14 in between.

Finally, the liquid crystal display panel 10 and the front face plate 13 bonded to each other as described above are arranged in the package member 15 together with the backlight unit 12. Thereby, the liquid crystal display 1 illustrated in FIG. 1 is completed.

Action and Effect of the Liquid Crystal Display 1

In the liquid crystal display 1, in the case where light enters the liquid crystal display panel 10 from the backlight unit 12, the incident light passes through the polarizing plate 11A, and is subsequently transmitted through a liquid crystal layer (not illustrated) while being modulated for every pixel based on a video voltage applied between the drive substrate 10A and the opposed substrate 10B. The light transmitted through the liquid crystal layer passes through the opposed substrate 10B having the color filter (not illustrated). Thereby, the light is extracted outside of the polarizing plate 11B as color display light.

Figure 7:
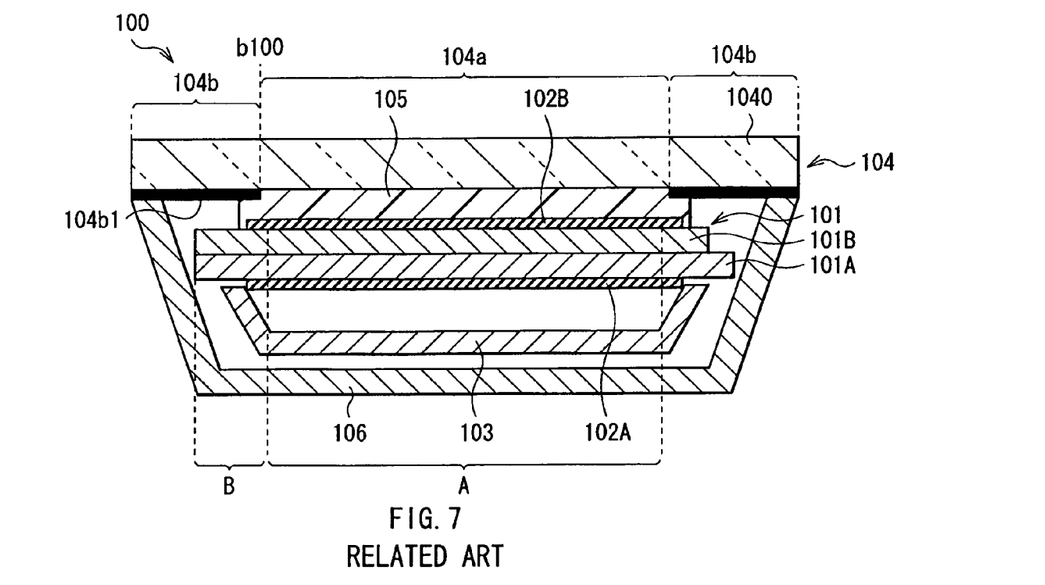
FIG. 7 is a cross sectional view illustrating a configuration of a liquid crystal display according to a comparative example.
Figure 8:
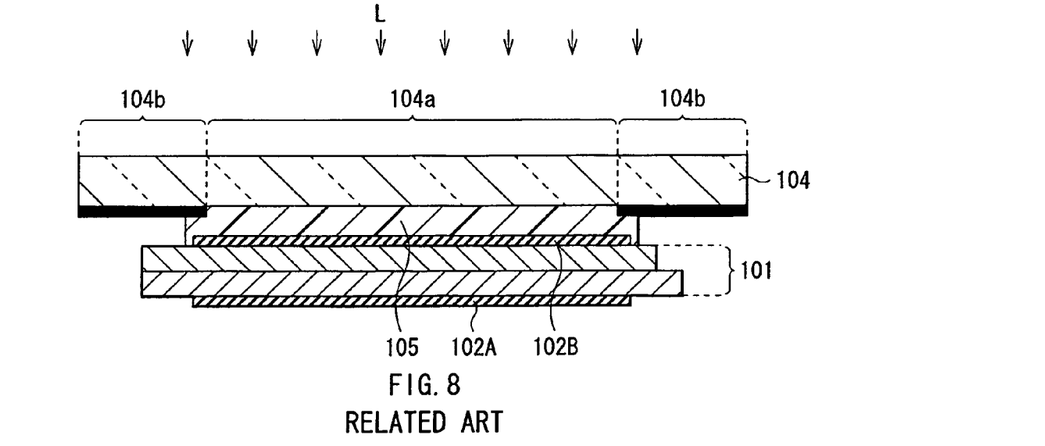
FIG. 8 is a cross sectional view illustrating part of a method of manufacturing the liquid crystal display illustrated in FIG. 7.

FIG. 7 and FIG. 8 illustrate a cross sectional configuration of a liquid crystal display 100 according to a comparative example and part of a method of manufacturing the same. The liquid crystal display 100 includes a backlight unit 103 on the rear face side of a liquid crystal display panel 101 and a front face plate 104 on the display side, respectively. The liquid crystal display panel 101 and the backlight unit 103 are arranged in a package member 106. Between the liquid crystal display panel 101 and the front face plate 104, a light curing resin layer 105 is provided. In the liquid crystal display panel 101, a liquid crystal layer (not illustrated) is sealed between a drive substrate 101A and an opposed substrate 101B. Polarizing plates 102A and 102B are bonded to outside faces of the drive substrate 101A and the opposed substrate 101B. In the liquid crystal display panel 100, in the front face plate 104, a region corresponding to the display region A of the liquid crystal display panel is a transmissive section 104a, and a light shielding section 104b is provided correspondingly to the non-display region B. In the light shielding section 104b, a light shielding layer 104b1 is formed on one face of a transparent substrate 1040. An edge b100 on the transmissive section 104a side of the light shielding section 104b is arranged in the non-display region B and in the vicinity of the boundary between the display region A and the non-display region B.

In the manufacturing process of the liquid crystal display 100 of comparative example, as illustrated in FIG. 8, the light shielding section 104b is provided in the region corresponding to the non-display region B of the front face plate 104. Thus, when light is irradiated from the front face plate 104 side, the following defect is generated. That is, when light is irradiated from the front face plate 104 side having such a light shielding section 104b, of the light curing resin layer 105, in the region on the rear side of the light shielding section 104b, light is not sufficiently obtained, and an uncured resin remains. That is, in the light curing resin layer 105 after irradiating light, the section corresponding to the transmissive section 104a of the front face plate 104 is cured, while the section corresponding to the light shielding section 104b is not cured. Thus, around the display region A, stress balance in the light curing resin layer 105 is lost. Therefore, around the display region A, the thickness of the liquid crystal display panel 101 is changed, and frame-like unevenness is generated. Such thickness unevenness is significantly shown in the case where, in particular, a black screen is observed in the diagonal direction, and may be a factor to lower display quality.

Meanwhile, in this embodiment, in the manufacturing process, light is irradiated from the front face plate 13 side having the light shielding section 13c and thereby the resin material of the light curing resin layer 14 is cured. The half-transmissive section 13b is provided between the transmissive section 13a and the light shielding section 13c of the front face plate 13. Thereby, in the light curing resin layer 14, in the vicinity of the boundary between the display region A and the non-display region B (around the display region A), the ratio of the uncured resin material is decreased. Further, rapid resin characteristic change between the cured section and the uncured section of the resin material is inhibited. Thus, stress balance around the display region A is favorably retained, and frame-like unevenness is inhibited from being generated in the thickness of the liquid crystal display panel 10. Further, light shielding characteristics in the front face plate 13 is not ruined largely in the region around the display region A.

As described above, in this embodiment, the front face plate 13 is provided on the display side of the liquid crystal display panel 10 with the light curing resin layer 14 in between. In the front face plate 13, the light shielding section 13c is provided correspondingly to the non-display region B. In addition, the half-transmissive section 13b with the light transmittance that is lower than that of the transmissive section 13a and higher than that of the light shielding section 13c is provided in the region between the transmissive section 13a and the light shielding section 13c. Thereby, unevenness is inhibited from being generated in the thickness of the liquid crystal display panel 10 without largely ruining light shielding characteristics in the region around the display region A. Thus, it is possible that the front face plate 13 having the light shielding section 13c is provided on the display side of the liquid crystal display panel 10 with the light curing resin layer 14 in between, and display unevenness in the region around the display region is inhibited from being generated. Thereby, display quality is improved, and high quality video display is able to be realized.

EXAMPLES

Next, a description will be given of the liquid crystal display of the invention with reference to specific examples (Examples 1 to 4).

Example 1

As Example 1, the front face plate 13 was layered on the transmissive VA type liquid crystal display panel 10 having a screen size of 40, 46, 52, or 60 inches as diagonal dimensions with the light curing resin layer 14 made of an ultraviolet curing resin having a thickness of 200 μm in between. After that, ultraviolet was irradiated from the front face plate 13 side. At that time, as an irradiation light source, a metal halide lamp with illuminance of 100 mW/cm$^2$ that mainly emits light with 365 nm was used, and accumulated amount of 5000 mJ/cm$^2$ was irradiated. The front face plate 13 was larger than the liquid crystal display panel by about 5 cm vertically and horizontally. As the ultraviolet curing resin, an acryl resin having the curing shrinkage ratio of 2.8% and the storage elastic modulus at 25 deg C. after curing the resin of $5.0*10^5$ Pa was used. As the front face plate 13, a plate in which the light shielding section 13c and the half-transmissive section 13b were formed on the transparent substrate 130 made of glass having a plate thickness of 2.5 mm was used. The dimensions of the half-transmissive section 13b were the same as those of the light shielding region in the non-display region B of the liquid crystal display panel 10. Circular opaque regions having a diameter of 1 mm were pattern-formed, and thereby the ratio occupied by the opaque region in the whole half-transmissive section 13b was 50% uniformly in the plane.

Example 2

As Example 2, in the same manner as that of the foregoing Example 1, the front face plate 13 was layered on the transmissive VA type liquid crystal display panel 10 having a screen size of 40, 46, 52, or 60 inches with the light curing resin layer 14 made of an ultraviolet curing resin having a thickness of 200 μm in between. After that, ultraviolet was irradiated from the front face plate 13 side. At that time, the ultraviolet irradiation conditions, the outer dimensions of the front face plate 13, the material and the plate thickness of the transparent substrate 130, the ultraviolet curing resin material, and the dimensions of the half-transmissive section 13b were similar to those of the foregoing Example 1. However, in Example 2, circular opaque regions having a diameter from 0.6 mm to 1.2 mm both inclusive were pattern-formed from inside to outside, and thereby the ratio of the foregoing opaque region was changed between the region on the transmissive section 13a side an the region on the light shielding section 13c side. Specifically, the ratio of the foregoing opaque region was 30% in the region on the transmissive section 13a side and 80% in the region on the light shielding section 13c side.

Example 3

As Example 3, in the same manner as that of the foregoing Example 2, the front face plate 13 was layered on the transmissive VA type liquid crystal display panel 10 having a screen size of 40, 46, 52, or 60 inches with the light curing resin layer 14 made of an ultraviolet curing resin having a thickness of 200 μm in between. After that, ultraviolet was irradiated from the front face plate 13 side. At that time, the ultraviolet irradiation conditions, the outer dimensions of the front face plate 13, the material and the plate thickness of the transparent substrate 130, the dimensions of the half-transmissive section 13b, the repeating pattern of the opaque region, and the ratio of the opaque region were similar to those of the foregoing Example 2. However, in Example 3, as the ultraviolet curing resin, a resin having the curing shrinkage ratio of 2.0% and the storage elastic modulus at 25 deg C after curing the resin of $5.0*10^4$ Pa was used.

Example 4

As Example 4, in the same manner as that of the foregoing Example 2, the front face plate 13 was layered on the transmissive liquid crystal display panel 10 having a screen size of 40, 46, 52, or 60 inches with the light curing resin layer 14 made of an ultraviolet curing resin having a thickness of 200 μm in between. After that, ultraviolet was irradiated from the front face plate 13 side. At that time, the ultraviolet irradiation conditions, the outer dimensions of the front face plate 13, the material and the plate thickness of the transparent substrate 130, the ultraviolet curing resin material, the dimensions of the half-transmissive section 13b, the repeating pattern of the opaque region, and the ratio of the opaque region were similar to those of the foregoing Example 2. However, in Example 4, as the liquid crystal display panel 10, IPS type was used instead of the VA type.

Comparative Example

As a comparative example of the foregoing Examples 1 to 4, as illustrated in FIG. 8, the front face plate 104 was layered on the liquid crystal display panel 101 with the light curing resin layer 105 in between. After that, ultraviolet was irradiated from the front face plate 104 side. As the liquid crystal display panel 101, a transmissive VA type liquid crystal display panel having a screen size of 40, 46, 52, or 60 inches was used as in the foregoing Example 1. As the light curing resin layer 105, an ultraviolet curing resin having a material and a thickness similar to those of the foregoing examples was used. Further, the ultraviolet irradiation conditions, the outer dimensions, the material and the plate thickness of the front face plate 104, of the transparent substrate 1040 were similar to those of the foregoing examples. However, in comparative example, in the front face plate 104, a plate in which a half-transmissive section was not provided between the transmissive section 104a and the light shielding section 104b was used. The light shielding section 104b was formed so that the edge b100 inside of the light shielding section 104b corresponded with the borderline between the display region A and the non-display region B of the liquid crystal display panel 101.

As described above, for Examples 1 to 4 and comparative example, the liquid crystal displays were fabricated, each display image was observed, and presence of display unevenness was evaluated. The result is illustrated in Table 1. As illustrated in Table 1, visual display unevenness was very few in Examples 1 to 4 in which the half-transmissive section 13b was provided in the front face plate 13, while display unevenness was generated in comparative example in which the half-transmissive section was not provided. Further, in Examples 2 to 4 in which the light transmittance in the half-transmissive section 13b was changed, more favorable result was obtained for the following reason. That is, rapid resin characteristics change between the cured section and the uncured section of the resin was effectively inhibited. As described above, it was found that even in the case where the front face plate 13 having the light shielding section 13c was provided on the display side of the liquid crystal display panel 10 with the light curing resin layer 14 in between, by providing the half-transmissive section 13b on the front face plate 13, a high quality liquid crystal display without display unevenness was able to be provided as well.

TABLE 1

| | Example 1 | Example 2 | Example 3 | Example 4 | Comparative example 1 |
|---|---|---|---|---|---|
| 40 inches | good | very good | very good | very good | Poor |
| 46 inches | good | very good | very good | very good | Poor |
| 52 inches | good | very good | very good | very good | Poor |
| 60 inches | good | very good | very good | very good | Poor |

Very good: Unevenness never viewed
Good: Unevenness slightly viewed but not annoying
Poor: Heavy unevenness viewed and disturbing While the invention has been described with reference to the embodiment and the modified examples, the invention is not limited to the foregoing embodiment and the like, and various modifications may be made. For example, in the foregoing embodiment and the like, the description has been given of the case that the polarizing plate 11B on the light emitting side of the liquid crystal display panel 10 is bonded to the surface of the liquid crystal display panel 10 as an example. However, the polarizing plate 11B may be provided on the observer side surface of the front face plate 13.

It should be understood by those skilled in the art that various modifications, combinations, sub-combinations and alternations may occur depending on design requirements and other factors insofar as they are within the scope of the appended claims or the equivalents thereof.

The invention claimed is:
1. A liquid crystal display device comprising:
a front face plate having a first section, a second section, and a third section,
the first section being a light transmissive section and the second section being a light shielding section,
the third section being arranged between the first section and the second section, and
the third section having a transmittance value which is lower than that of the first section and higher than that of the second section.

2. The liquid crystal display device of claim 1, in which the third section includes a number of opaque regions, each opaque region having a predetermined shape.

3. The liquid crystal display device of claim 2, in which a ratio of an area occupied by the number of opaque regions to a total area of the third section gradually increases from a side of the third section which adjoins the first section to an opposite side of the third section which adjoins the second section.

4. The liquid crystal display device of claim 2, in which the predetermined shape of the opaque regions is circular, square, or triangular.

5. The liquid crystal display device of claim 2, in which the predetermined shape of the opaque regions is circular or square and in which the opaque regions gradually increase in size from a side of the third section which adjoins the first section to an opposite side of the third section which adjoins the second section.

6. The liquid crystal display device of claim 5, in which when the opaque regions are circular a diameter of each circular shape increases from approximately 0.7 mm to approximately 1.2 mm and when the opaque regions are square a side of each square shape increases from approximately 0.5 mm to approximately 1.0 mm.

7. The liquid crystal display device of claim 2, in which the predetermined shape of the opaque regions is triangular and each triangular shape has a bottom width of approximately 1.5 mm and a height of approximately 4 mm.

8. The liquid crystal display device of claim 1, in which the front face plate includes a display region and an outer region outside of the display region, in which at least a substantial portion of the first section is in the display region and an entire portion of the second section and an entire portion of the third section are in the outer region.

9. The liquid crystal display device of claim 8, further comprising a liquid crystal display panel arranged to be substantially parallel to the front face plate, said liquid crystal display panel having a plurality of pixels arranged therein which are aligned with the display region.

10. The liquid crystal display device of claim 9, in which the second section and the third section are located on a side of the front face plate which faces the liquid crystal display panel.

11. The liquid crystal display device of claim 10, further comprising a light curing resin layer positioned between the front face plate and the liquid crystal display panel such that an entire surface of the first section contacts the resin layer, at least a portion of a surface of the third section contacts the resin layer, and the second section is located entirely away from the resin layer so as to avoid contact thereof.

12. The liquid crystal display device of claim 1, in which the first section has a rectangular shape, the third section is formed outside a perimeter of the rectangular shaped first section, and the second section is formed outside a perimeter of the third section.

* * * * *